April 21, 1925.

M. H. RUHMANN 1,535,041

STAND

Original Filed May 5, 1923   4 Sheets-Sheet 1

WITNESSES

M. H. Ruhmann
INVENTOR

BY Victor J. Evans
ATTORNEY

April 21, 1925.

M. H. RUHMANN 1,535,041

STAND

Original Filed May 5, 1923    4 Sheets-Sheet 3

M. H. Ruhmann, INVENTOR

BY Victor J. Evans
ATTORNEY

WITNESSES

April 21, 1925.
M. H. RUHMANN
1,535,041
STAND
Original Filed May 5. 1923    4 Sheets-Sheet 4
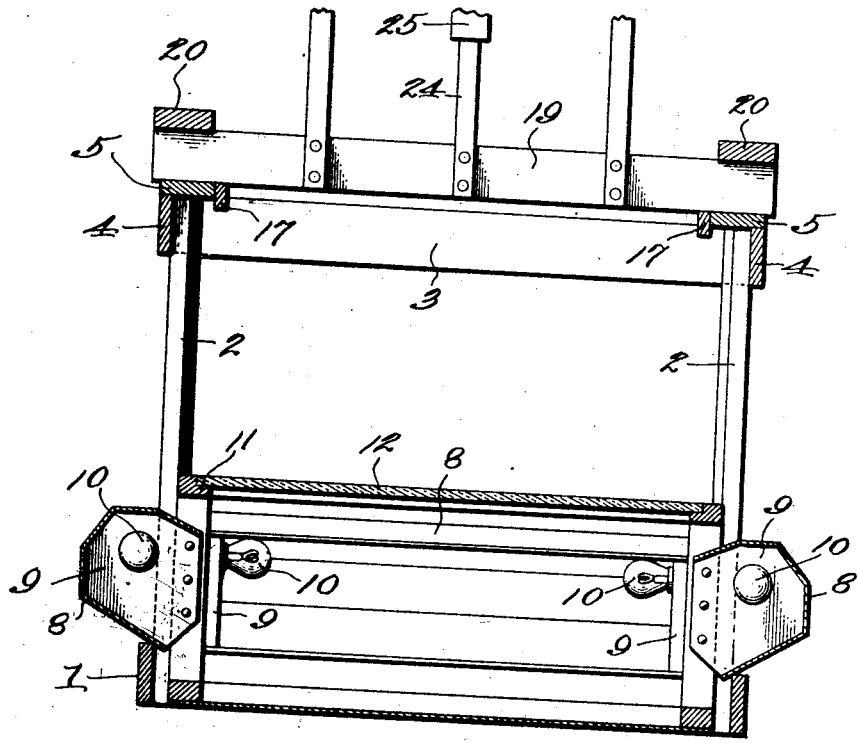
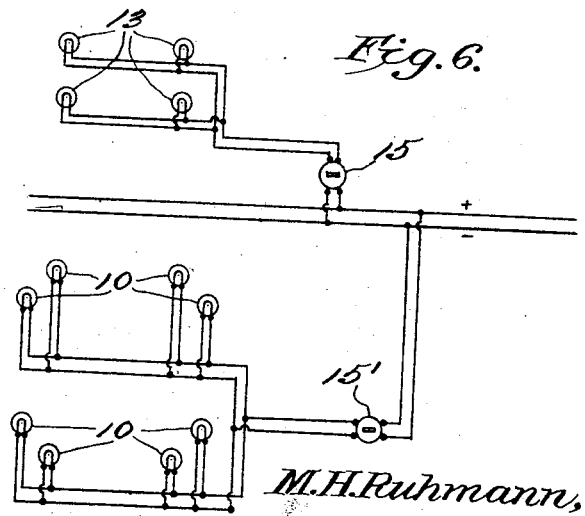

Patented Apr. 21, 1925.

1,535,041

UNITED STATES PATENT OFFICE.

MAX H. RUHMANN, OF VERNON, BRITISH COLUMBIA, CANADA.

STAND.

Application filed May 5, 1923, Serial No. 637,026. Renewed November 17, 1924.

*To all whom it may concern:*

Be it known that I, MAX H. RUHMANN, a subject of the King of Great Britain, residing at Vernon, in the Province of British Columbia and Dominion of Canada, have invented new and useful Improvements in Stands, of which the following is a specification.

This invention has reference to an apparatus, especially designed for use in scientific laboratories, in photographing objects for reproduction, such as plant specimens, flowers, illustrations of pathological conditions, insects, plants injured by insects and other innumerable subjects which come before a laboratory worker for permanent record. The apparatus may be also employed in commercial studios.

The primary object is to produce a shadowless vertical copying stand for this purpose.

In carrying out the invention I provide a translucent horizontal object base upon which specimens are arranged in practically their natural position without artificial aid, and a lighting system which renders the photographic negative entirely free of all shadows and all halation so that the finest details of the objects will be finely produced on any type of photographic plate or film.

I also aim to produce a shadowless copying stand in which the camera is vertically adjustably supported in a position above the object base and is susceptible to both longitudinal and lateral adjustments over the base, and which stand is of a nature and construction and is provided with a lighting system of such arrangement as to be automatically correct so that copying of specimens, illustrations, photographs, diagrams, etc., is greatly simplified and perfect results may be obtained even by an amateur.

To the accomplishment of the foregoing and related objects, the invention consists of the means hereinafter fully described and particularly pointed out in the claims.

The drawings which accompany and which form part of this application illustrate a satisfactory embodiment of the improvement reduced to practice, and wherein:—

Figure 5 is a perspective view of the slide for the camera supporting frame.

Figure 6 is a similar view of the camera supporting frame.

Figure 1:
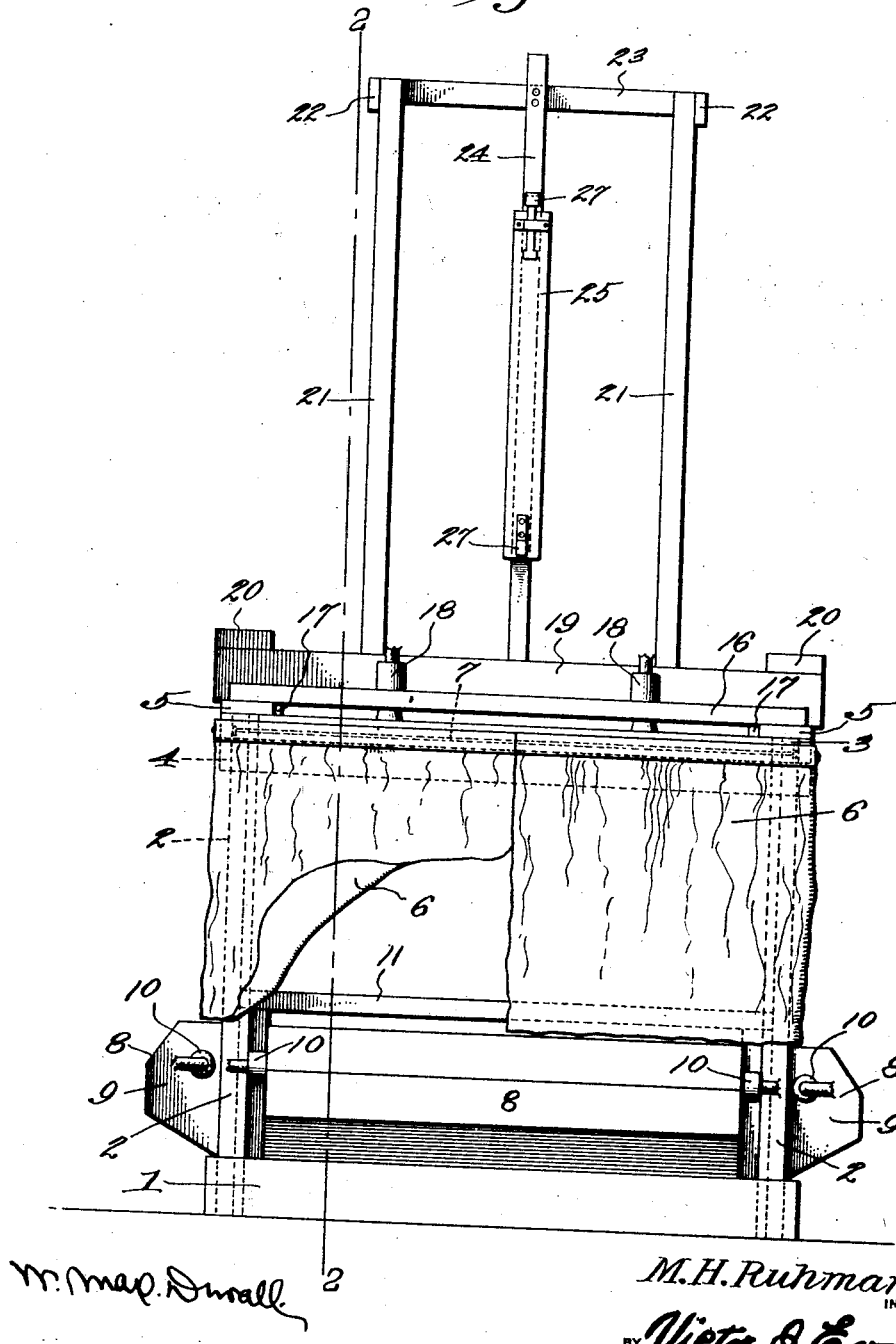
Figure 1 is a front elevation of the apparatus with a bellows camera supported thereon.
Figure 2:
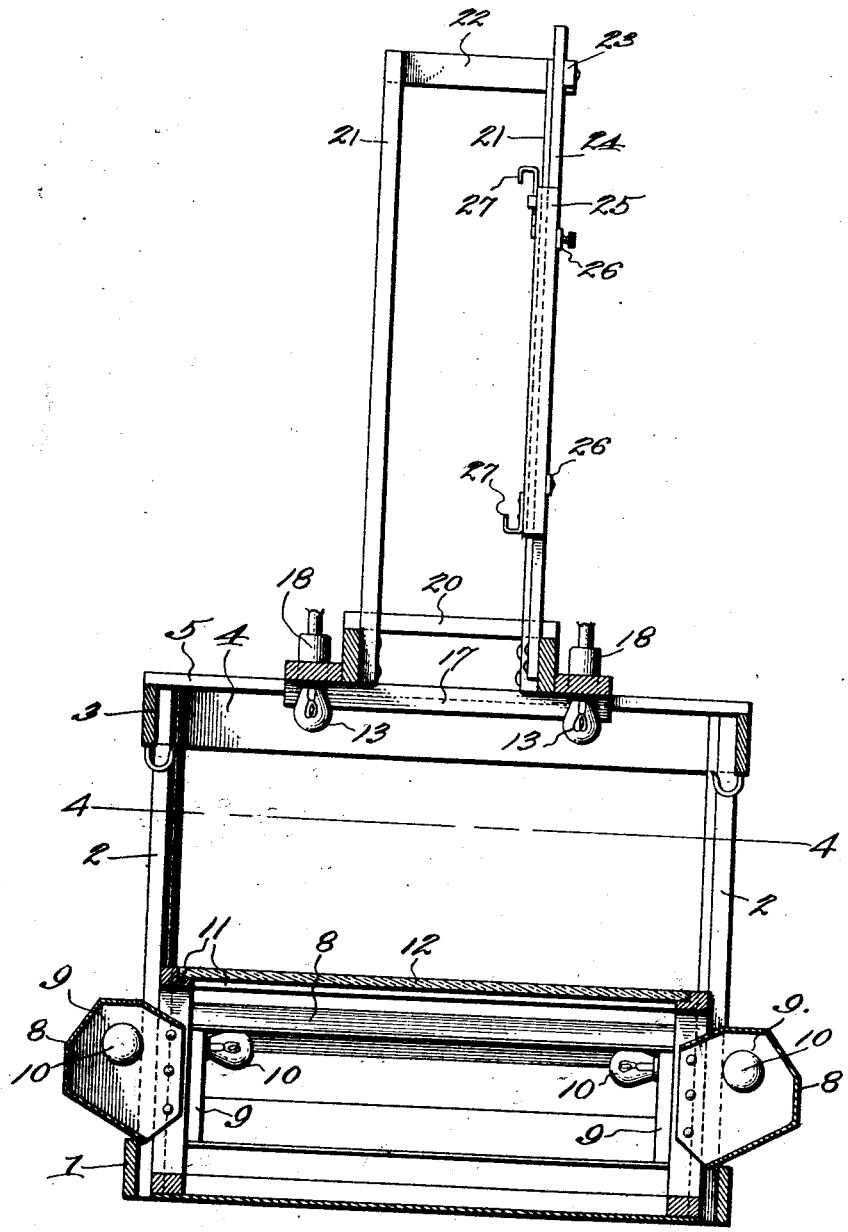
Figure 2 is a sectional view approximately on the line 2—2 of Figure 1.
Figure 3:
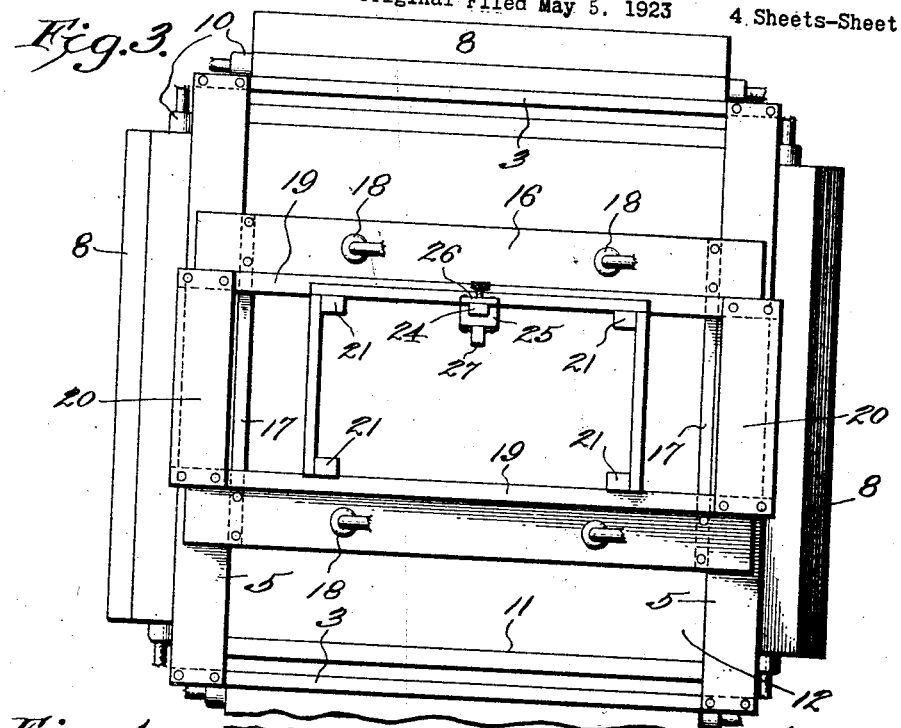
Figure 3 is a plan view of the improvement.
Figure 4:
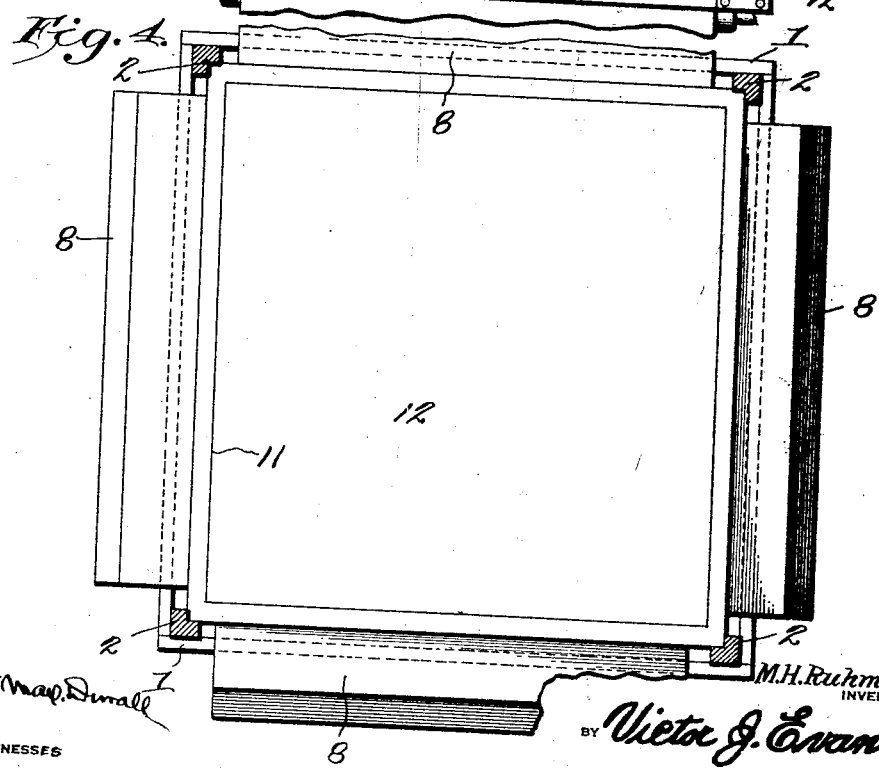
Figure 4 is a horizontal sectional view approximately on the line 4—4 of Figure 2.

The stand is of square or rectangular construction to include a closed bottom or base 1 having uprights 2 arising from the corner of the base and connected together at their upper portions by longitudinal and transverse cleats 3 and 4 respectively. Also there are secured to the upper ends of each pair of uprights horizontally disposed strips 5.

I secure to the cleats 3 and 4 a light obscuring medium in the nature of a curtain 6. The curtain is tacked or otherwise rigidly secured to all of the cleats except that at the front of the stand, and it is at this portion of the apparatus that the ends of the curtain are arranged. The upper edge of the curtain is rolled upon itself and stitched and in the fold thus provided there is inserted a wire member 7 whose ends are secured to the standard and which provides a guide means for the ends of the curtain to permit of the same being spread apart or closed as occasion requires.

The base 1 has its sides and ends provided with outwardly extended cross sectionally V-shaped reflectors 8 respectively, and secured on the straight ends 9 of the said reflectors there are the sockets of lamp bulbs 10. The interior of the base is painted white as may be the V-shaped elements which I have termed reflectors, and the top of the base is provided with a continuous groove to form a supporting ledge 11 for a translucent screen 12 on which the objects to be reproduced are placed.

Arranged on the inner face of the uprights 2, and at any other desired portions of the natural light excluding curtains 6 there are lamp bulbs 13, the conductors for all of the bulbs and those which hereinafter be described being, of course, connected with a suitable source of electricity and being controlled respectively by switches 15 and 15'.

Arranged for slidable movement on the strips 5 of the stand there is a guide for a camera supporting frame. The guide comprises two strips or plates 16 connected and held in spaced relation by strips 17. The ends of the plates 16 overlie the strips 5 and the connecting elements or strips 17 for the said plates are respectively in contacting engagement with the inner edges of the strips 5 of the stand. The plates 16 receive therethrough the sockets 18 of lamp bulbs 13, the conductors of which being connected with the conductors 14, and the rays of light from the lamps 13 will, of course, be downwardly directed.

The camera supporting frame includes a base made up of a pair of plates 19 whose lower edges rest upon the connecting elements or strips 17 for the side plates of the guide and whose upper edges are connected at their ends by transverse strips 20. The plates 19 are in slight frictional contact with the confronting edges of the spaced plates 16 of the guide. Secured to the inner face of each of the plates 19 there are the vertical projecting posts 21 secured in spaced relation at their upper ends by transverse strips 22 and by a rear longitudinal strip 23. Thus the front of the frame is open. Secured centrally to the strip 23 and to the rear plate 19 there is a rod 24 which is substantially rectangular in cross section and which has slidably arranged thereon a channeled bar 25, the parallel side members of which having secured thereon spaced straps 26 which are in contacting engagement with the rear face of the element 24.

Suitable binding means between one or both of the straps and the element 24 is provided whereby the member 25 will be held adjusted on the element 24. The slidable channeled member 25 carries spring clips 27 respectively to engage the focusing end of a bellows camera 28. The body of the camera may be supported on or in the frame, and by adjusting the channeled member 25 a proper focus can be obtained on the object on the semi-transparent screen 12.

Other lamp bulbs than those described may be arranged on the camera supporting frame when more illumination is required in reproducing the object upon the screen.

With my improvement, it will be apparent to those skilled in the art that the light from the lamps in the reflectors in the base is transmitted through the ground glass screen 12 which has the properties of breaking up all light rays and thereby preventing halation. The lamps inside the stand and over the object to be photographed give an even illumination over the entire object, while the focusing is done in the usual manner through the ground glass at the back of the camera. The camera is susceptible to both lateral and longitudinal adjustment and a natural or opaque background is obtained without any shadow being recorded on the screen. The lighting is always uniformly centered for any class of work and any need of retouching the negative is practically eliminated.

The stand cannot only be successfully used for reproducing specimens but may be employed for copying portraits, paintings, etc., while in process work, a perfect black and white negative without shadows can be obtained without the use of process plates, the most perfect detail and graduations being automatically obtained by use of any plate or film, while the regular color process can also be used with the stand. Where a clear background is required a black sheet of velvet is placed over the screen and the specimen placed thereon.

While I have illustrated a satisfactory embodiment of my improved apparatus, my features of invention are capable of extended application, and I do not wish to be limited to the specific structure shown and described.

Having described the invention, I claim:—

1. An apparatus for the purpose described, comprising a stand including a closed base having on its top a translucent objective screen and lamps in the base for directing rays of light against the screen, a natural light obscuring element around the stand above the base having lamps therein for directing rays of light against the screen, and supporting means for a vertically disposed inverted camera movable longitudinally and transversely over the stand.

2. An apparatus for the purpose described, comprising a stand including a closed base having on its top a translucent objective screen and lamps in the base for directing rays of light against the screen, a natural light obscuring element around the stand above the base having lamps therein for directing rays of light against the screen, a guide laterally movable on the top of the stand, a camera supporting frame on the guide and movable longitudinally thereover, and said frame designed to support a vertically disposed inverted camera thereon.

3. An apparatus for the purpose described, comprising a stand including a closed base having on its top a translucent objective screen and lamps in the base for directing rays of light against the screen, a natural light obscuring element around the stand above the base having lamps therein for directing rays of light against the screen, a guide made up of spaced plates and strips connecting the plates slidable on the top of the standard, a frame for a vertically disposed camera slidably mounted on the guide, and means on the frame for vertically adjusting the focusing end of the camera.

4. In an apparatus for the purpose described, a substantially rectangular stand including a closed base having its sides and ends provided with outwardly extending cross sectionally V-shaped reflectors, lamps in the ends of the reflectors, a ground glass objective screen on the top of the base and against which the rays of light from the lamps are directed, a curtain secured to the stand above the base for obscuring natural light from the screen, lamps in the stand for directing rays of light downwardly on to the screen, a guide movable over the top of the stand, a camera supporting frame slidably mounted on the guide, said frame designed to receive therein a vertically arranged inverted camera, and means on the frame engaging the camera for vertically adjusting the same thereon.

In testimony whereof I affix my signature.

MAX H. RUHMANN.